UNITED STATES PATENT OFFICE.

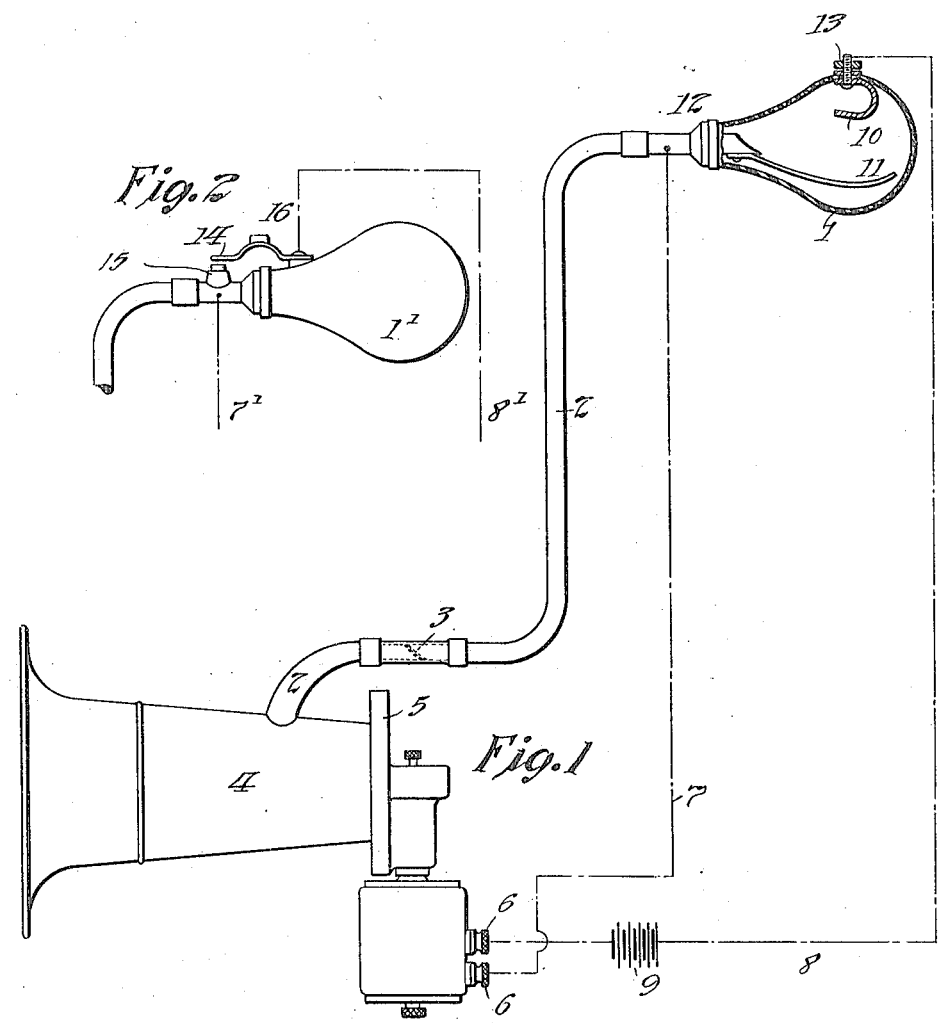

ALEXANDER N. PIERMAN, OF NEWARK, NEW JERSEY.

WARNING-SIGNAL.

1,198,147. Specification of Letters Patent. Patented Sept. 12, 1916.

Application filed March 8, 1912. Serial No. 682,413.

*To all whom it may concern:*

Be it known that I, ALEXANDER N. PIERMAN, a citizen of the United States, and a resident of Newark, in the county of Essex and State of New Jersey, have invented a certain new and useful Improvement in Warning-Signals, of which the following is a specification.

My invention relates to signaling devices for warning by means of sound, and may be used for any purpose for which such signaling devices can be utilized, but is particularly adapted for use on motor vehicles, such as pleasure cars, motor trucks and the like.

Heretofore there have been two principal types of devices made use of for this purpose, namely, the reed horn which is operated by pressing a rubber bulb or similar device, and the electrically operated signaling device, which comprises a diaphragm and a megaphone connected therewith and some means operated by the passing of an electrical current for setting the diaphragm into vibration, thus producing the sound for giving the desired warning.

The fields of service covered by each of the signaling means above referred to and now in general use are to a large extent distinct from one another, the usefulness of the reed or bulb horn being limited practically to city traffic, and under conditions where the distance to which the warning signal is to be conveyed is not considerable, and where the speed of the motor vehicle is relatively slow; and the electrically operated signaling device covering the field of use which corresponds to a more rapid operation of the vehicle, and being especially adapted for use in the open country where it may be desired to convey the sound for a considerable distance ahead and sometimes around a bend in the road. These conditions are well understood and it is therefore quite a usual thing to find a single motor vehicle equipped with both of these signaling devices. Nevertheless, although the fields of use of the two types of signaling devices referred to are largely distinct, there exists a zone in which they may be said to overlap and in which there is frequent necessity for a substantially instantaneous shift from one to the other; as, for instance, the operator of the vehicle may make use of the reed horn for sounding a warning to a person who has plenty of time to observe the signal and avoid collision with the vehicle, and who is also within easy hearing distance of the signal, but if, for any reason, as inattention or because of the signal being drowned by extraneous noises, the signal given by the reed horn is not observed, the occasion arises for the immediate and practically instantaneous use of the louder signal furnished by the electric horn, and inasmuch as in the arrangement heretofore made use of, the actuating means of the two horns, namely, the bulb of the reed horn and the switch or push button of the electrical horn, are separately arranged and situated perhaps at some distance from one another, there is opportunity and frequently likelihood of the necessary second and louder signal not being produced in time to prevent collision, or at least of it becoming necessary for the driver of the motor vehicle to slow down or stop the machine, when, if the signal could be readily and quickly produced as desired, no such occasion would arise. In the open country too, there is also frequent occasion for the immediate use of the electrically operated signaling device, in conjunction with the reed horn. Drivers of wagons and other slow moving vehicles are likely to pay no attention to the reed horn, notwithstanding it is perfectly audible to them, whereas if the electrical horn is used the driver will move out of the way, in a more or less involuntary fashion, being compelled, as it were, by the insistent warning of the electrical horn, to make way for the faster vehicle. It will be seen, therefore, that an arrangement which makes it possible for the warning signaling device of comparatively smaller volume, such as a reed horn, to be immediately supplemented at need with certainty by a loud and insistent warning, such as may be furnished, for example, by the electrically operated signaling device, is extremely useful in a variety of instances, and it is to fill this need that the invention of this application has been produced.

In the preferred form of my invention, means are provided whereby the sounding of the signal of least loudness such as the reed horn, may be continued as long as desired, and the same means made use of for sounding this signal may be used at will for the purpose of sounding the louder and harsher signal as, for example, the electric horn. One mode of accomplishing this purpose is by arranging the switch for the electrically operated instrument within the reed horn bulb, as by connecting the two separated portions of the electrical switch to different parts of the rubber bulb. With this arrangement, when the bulb is compressed, for the purpose of sounding the reed horn, this signal can be sounded repeatedly, and the electric signal will not be sounded unless the bulb is compressed sufficiently to bring its side walls substantially into contact with one another, at which time the switch members will be brought into contact and the current for the operation of the electrical horn will be permitted to pass, thus producing the louder and more insistent warning so long as the bulb remains sufficiently compressed. With this arrangement it will be evident that there is no occasion for loss of time in passing from the use of one signal to another, nor is there the possibility of the operator of the vehicle, in his haste to sound the second signal, and with his attention directed on the road in front of him, to miss the button or switch for the electrical signal when he reaches for it, and thus delay the production of such signal until it is too late. It will be noted that one advantage of the arrangement of the switch for the electrical horn within the rubber bulb of the reed horn, is that the location of the switch is hidden, and children and inquisitive observers will not be likely to operate the switch so situated, thus resulting in the production of useless and unnecessary noise, and also in the useless and unnecessary using up of the batteries or other source of current for the electrical signaling instrument.

A modified form of construction in which my invention may be embodied, consists in mounting of the switch for the electrically operated signaling device upon or in direct connection with the operating means for the other signaling device. As the latter device is in most instances a reed horn, one form which my invention may take is the mounting of the switch for the operation of the electrically operated horn wholly upon or in conjunction with the bulb of the reed horn. With these devices so arranged, it becomes possible to obtain practically all the advantages of the preferred form of the device, which I have already referred to, since when the driver of the vehicle has his hand on the horn bulb, it is also more or less in contact with the switch for the electrically operated horn, and all that is needed is merely to make contact between the switch members without moving the hand away from the horn bulb. It will be observed that with this form of device the degree of compression to which the horn bulb is subjected, will have no effect on the switch for the electrically operated instrument, and that it is necessary to operate a separate device for that purpose which, however, is so situated that it is practically under the hand of the operator when needed.

Inasmuch as a horn or megaphone is necessary to be provided for the electrically operated horn, there is no necessity for providing a separate similar device for the reed instrument, but the tube containing the reed may be led directly into the megaphone for the electrically operated horn, thus considerably simplifying the device. This, however, while the preferred arrangement, is not essential, as it will be readily understood, that while a single megaphone may be used for this purpose, in many instances it will be convenient to arrange the electrically operated signaling device and the reed operated device at a distance from each other, as, for example, on different sides of the vehicle, in which case separate megaphones would naturally be made use of.

In equipping existing signaling instruments already installed on motor vehicles with my invention, nothing is needed except the substitution of a bulb and switch constructed in accordance with my invention, and of course the necessary wiring for conducting the electric current.

For a better understanding of my invention, reference is made to the accompanying drawings in which the same reference numerals are applied to the same parts throughout and in which—

Figure 1 is a view partly in section of the preferred form of my invention, and Fig. 2 is a view showing a modified form of controlling means.

In the said drawings the reference numeral 1 is applied to the rubber bulb of the reed horn, and 2 designates the tubing for conveying the air to the vibrating reed, which is shown in dotted lines at 3, and the continuation of the tube 2 is connected to the megaphone 4 of the electrically operated horn 5, which contains a diaphragm and electrically operated actuating means therefor, not illustrated. This tube 2 may be connected to the megaphone in any desired manner, or if desired a separate megaphone may be provided for the reed horn. The wires for carrying the current for operating the electrically actuated signaling device, are connected by the binding screws 6, 6, the current passing through wires 7 and 8 and being supplied from a battery or other source of current 9. In Fig. 1 the switch members arranged within the horn bulb are indicated by reference numerals 10 and 11, any suitable electrical connection between such switch members 10 and 11 and the battery wires 7 and 8 respectively, being provided. In the drawings I have shown the wire 7 connected with the metallic ferrule 12 which carries the switch member 11, and the wire 8 connected to the switch member 10 by means of a binding screw 13, protruding through the exterior of the horn bulb. It will be apparent, however, that this mode of connection is merely illustrative, and that any method of wiring whereby electrical connection is made from the two branches of the wiring to the respective switch members within the horn bulb, may be utilized.

In Fig. 2 I have shown a switch comprising members 14 and 15, the member 14 being mounted directly on bulb 1' and being provided with push button 16 in order that it may be conveniently actuated by the fingers of the operator. The wires 7' and 8' for the electrical horn circuit are connected with the two switch members 14 and 15 respectively in any convenient manner.

The operation of my improved device will now be readily understood. In the device shown in Fig 1, when the bulb 1 is compressed, the air will be driven through the tube 2 and actuate the reed horn 3, producing a warning signal which is amplified by the megaphone 4. Such signal may be used as often as desired and may be repeated as frequently as the operator may wish and in order to obtain in conjunction therewith the warning signal from the electrically operated instrument 5, it is only necessary to compress the bulb 1 until the switch member 10 makes contact with the switch member 11, and as long as these members are held in contact, the current will pass and the electrical alarm will be sounded. It is evident that both the devices may be sounded in conjunction by repeatedly compressing the bulb 1 until the switch members 10 and 11 make contact, thus allowing the current to pass for a limited interval, then permitting the bulb to expand and recompressing it, or either of the two instruments may be sounded by itself, the reed horn by limiting the compression to a degree which does not bring the switch members into contact, and the electrical instrument by holding the bulb so compressed as to retain the contact between the switch members.

The operation of the device shown in Fig. 2 will likewise be readily understood. The reed horn is operated by the compression of the rubber bulb 1'; and when the operator desires to make use of the electrical instrument he can readily do so, for inasmuch as the switch button 16 is practically under the finger of the operator, whose hand is already in contact with the horn bulb, there is no occasion for any loss of time in sounding such electrical signal or difficulty in its location.

Having now described my invention, I claim:

1. The combination of a reed horn comprising a hollow bulb, an electrically operated signaling device, and a switch for said electrically operated device contained within the bulb of the horn, substantially as set forth.

2. The combination of a signaling device operated by fluid pressure and comprising a hollow bulb, an electrically operated signaling device, and a switch for said electrically operated device contained within the said hollow bulb, substantially as set forth.

3. In combination a signaling device operated by fluid pressure and comprising a compressible bulb and an electrically operated signaling device, a switch therefor comprising two normally separated members, both contained within the said bulb and so arranged that they will be brought into contact when the bulb is sufficiently compressed, substantially as set forth.

4. In combination, a reed horn comprising a compressible bulb and an electrically operated signaling device, a switch therefor comprising two normally separated members both contained within the horn bulb and so arranged that they will be brought into contact when the horn bulb is sufficiently compressed, substantially as set forth.

5. In combination, a signaling device operable by the passage of a current of air and comprising a compressible bulb for creating such air current, an electrical signaling device, and a switch therefor within the horn bulb, the switch being so arranged that when the bulb is sufficiently compressed the normally separated switch members will be brought into contact to permit the passage of an electrical current to operate the electrical signaling device, substantially as set forth.

6. In combination, a pneumatic signaling device comprising a rubber bulb and a metallic eduction tube therefor, an electrically operated signal, a switch therefor comprising two normally separated members, one of said members being electrically connected with said metallic tube and the other of said members being movable upon the compression of said bulb to make contact with the first named member, substantially as set forth.

7. In combination, a rubber horn bulb, and a switch for closing an electric horn circuit, said switch being located in said bulb, substantially as set forth.

ALEXANDER N. PIERMAN.

Witnesses:
FRANK D. LEWIS,
ANNA R. KLEHM.